UNITED STATES PATENT OFFICE 2,635,093

POLYMERIZATION OF VINYLIDENE FLUORIDE TO WAXY PRODUCTS

Charles B. Miller, Lynbrook, N. Y., and John D. Calfee, Dayton, Ohio, assignors to Allied Chemical & Dye Corporation, New York, N. Y., a corporation of New York No Drawing. Application November 13, 1950, Serial No. 195,474

3 Claims. (Cl. 260—92.1)

This invention relates to novel polymers of fluorine-containing, unsaturated compounds and to a process for the manufacture of such products. More particularly the present invention is directed to a novel process for the preparation of polymers of vinylidene fluoride.

This application is a continuation-in-part of our application Serial No. 21,566, filed April 16, 1948.

In the past it has been proposed to polymerize vinylidene fluoride by contacting the vinylidene fluoride at a temperature between 20° C. and 250° C. under a pressure above 30 atmospheres with a polymerization catalyst. This process produces polymers of vinylidene fluoride in powdery or granular form.

In accordance with this invention vinylidene fluoride is heated under substantially non-catalytic conditions at a temperature between 300° C. and 500° C., preferably between 400° C. and 450° C., and at an absolute pressure of at least 2,000 pounds per square inch, preferably between 5,000 pounds per square inch and 10,000 pounds per square inch.

We have found that by polymerizing vinylidene fluoride under the specified conditions of temperature and pressure in the substantial absence of a catalyst, polymers varying from a mixture of a viscous liquid and a soft wax, having the physical properties of the soft paraffin waxes, to a hard wax, having the physical properties of the carnauba waxes, are obtainable. These waxy polymers have good light and heat stability and compared to the ordinary petroleum waxes are distinguished by their high water-repellency, their resistance to inorganic acids and bases, and, particularly in the case of the harder waxes, by their insolubility in petroleum hydrocarbon and halogenated hydrocarbon solvents.

The waxy vinylidene fluoride polymers of this invention have been found to be excellent for use in automobile and leather polishes, wherever resistance to petroleum hydrocarbon solvents such as gasoline and motor oils is an important consideration. The water-repellent properties of these new polymers also render them valuable for moisture-proofing paper and textiles and for coating metal to protect it against corrosion.

The soft waxes of the invention have been found to provide superior stop-cock lubrication, substantially outlasting the previously commercially available greases. As such they may be used under a variety of conditions, including high vacuum distillation. They are also especially useful under conditions where solvents such as halogenated hydrocarbons and petroleum hydrocarbons are handled, particularly in refrigerator compressor service. Similarly, they are of value in nitric or mixed acid service, for example, as lubricants in pumps and packed glands.

The following example illustrates the method of carrying out of the polymerization of this invention and the nature of the products obtained:

A pressure-resistant stainless steel reaction vessel is purged of air by passing deoxygenated nitrogen or other inert gas into the vessel until essentially all oxygen is removed. The vessel is then closed, evacuated and heated to reaction temperature. Vinylidene fluoride containing less than 100 P. P. M. and preferably less than 10 P. P. M. of oxygen is charged to the vessel until reaction pressure is attained. The vessel is then maintained at reaction temperature to effect the polymerization. Data for a series of runs at various temperatures and pressures are presented in the following table:

|   | Temp., ° C. | Pressure, lbs./sq. in. | Reaction Time, Hours | Character of Polymer |
|---|---|---|---|---|
| 1 | 425 | 2,300 | 6 | Mixture of viscous liquid and soft wax. |
| 2 | 425–430 | 5,300 | 8.5 | Mixture of soft wax and hard wax. |
| 3 | 425–430 | 6,200 | 4 | Do. |
| 4 | 400 | 6,500 | 4 | Hard wax. |

The vinylidene fluoride polymers obtained in the above runs may be fractionated by solution in benzene, resolving themselves into three fractions. Fraction 1, having a molecular weight up to 1000, is soluble in cold benzene; fraction 2, having a molecular weight between 1000 and 2000, is soluble in hot benzene; and fraction 3, having a molecular weight above 2000, is insoluble in hot benzene. As previously indicated, the polymers are substantially insoluble in petroleum hydrocarbon and halogenated hydrocarbon solvents.

The polymers of vinylidene fluoride having a molecular weight over 2000 may be dissolved in acetone to produce film-forming solutions.

We claim:

1. The process for preparing waxy vinylidene fluoride polymers which comprises heating vinylidene fluoride containing less than 10 parts per million of oxygen and in the absence of a catalyst at a temperature between 400° C. and 500° C. under a pressure of at least 2000 pounds per square inch.

2. The process for preparing waxy vinylidene fluoride polymers which comprises heating vinylidene fluoride containing less than 10 parts per million of oxygen and in the absence of a catalyst at a temperature between 400° C. and 450° C. under a pressure between 5000 pounds per square inch and 10,000 pounds per square inch.

3. A waxy vinylidene fluoride polymer obtained by the process of claim 1.

CHARLES B. MILLER.
JOHN D. CALFEE.

References Cited in the file of this patent

FOREIGN PATENTS

| Number | Country | Date |
|--------|---------|------|
| 590,817 | Great Britain | July 29, 1947 |